(12) United States Patent
Abernathy et al.

(10) Patent No.: US 8,515,236 B2
(45) Date of Patent: Aug. 20, 2013

(54) FIBER OPTIC DROP CABLE ASSEMBLY FOR DEPLOYMENT ON BUILDING WALLS

(75) Inventors: George C. Abernathy, Hildebran, NC (US); Daniel A. Cassell, Hickory, NC (US); Gerry J. Harvey, Newton, NC (US); Jimmy E. Lail, Hickory, NC (US); Kenneth D. Temple, Jr., Newton, NC (US)

(73) Assignee: Corning Cable Systems LLC, Hickory, NC (US)

( * ) Notice: Subject to any disclaimer, the term of this patent is extended or adjusted under 35 U.S.C. 154(b) by 337 days.

(21) Appl. No.: 12/796,943

(22) Filed: Jun. 9, 2010

(65) Prior Publication Data

US 2010/0310217 A1      Dec. 9, 2010

Related U.S. Application Data

(60) Provisional application No. 61/185,433, filed on Jun. 9, 2009.

(51) Int. Cl.
*G02B 6/44* (2006.01)

(52) U.S. Cl.
USPC .............................. 385/136; 385/100; 385/137

(58) Field of Classification Search
USPC ................................... 385/100–114, 136, 137
See application file for complete search history.

(56) References Cited

U.S. PATENT DOCUMENTS

| | | | | |
|---|---|---|---|---|
| 3,086,369 A | * | 4/1963 | Brown | 405/172 |
| 4,397,435 A | * | 8/1983 | Fisher et al. | 248/61 |
| 4,763,983 A | | 8/1988 | Keith | 350/96.23 |
| 4,776,664 A | | 10/1988 | Okura | 350/96.23 |
| 4,832,442 A | | 5/1989 | Pappas | 350/96.23 |
| 4,856,867 A | | 8/1989 | Gaylin | 350/96.23 |
| 4,993,795 A | | 2/1991 | Okura | 350/96.23 |
| 5,054,881 A | * | 10/1991 | Fisher et al. | 385/113 |
| 5,092,663 A | | 3/1992 | Hivner | 385/100 |
| 6,188,821 B1 | | 2/2001 | McAlpine et al. | 385/100 |
| 6,188,822 B1 | | 2/2001 | McAlpine et al. | 385/100 |
| 6,356,690 B1 | | 3/2002 | McAlpine et al. | 385/109 |
| 6,546,175 B1 | | 4/2003 | Wagman et al. | 385/113 |
| 6,563,990 B1 | | 5/2003 | Hurley et al. | 385/101 |
| 6,567,592 B1 | * | 5/2003 | Gimblet et al. | 385/113 |
| 6,785,450 B2 | | 8/2004 | Wagman et al. | 385/100 |
| 6,847,767 B2 | | 1/2005 | Hurley et al. | 385/101 |
| 6,898,363 B2 | * | 5/2005 | Forrester et al. | 385/134 |
| 7,035,513 B2 | | 4/2006 | Mohler et al. | 385/113 |
| 7,316,246 B2 | * | 1/2008 | Hayton | 138/110 |
| 7,391,943 B2 | | 6/2008 | Blazer et al. | 385/100 |
| 8,224,141 B2 | * | 7/2012 | Kachmar et al. | 385/106 |

FOREIGN PATENT DOCUMENTS

JP         2005148373 A  *  6/2005

* cited by examiner

*Primary Examiner* — Daniel Petkovsek (74) *Attorney, Agent, or Firm* — Russell S. Magaziner (57) ABSTRACT

A fiber optic drop cable assemblies and methods for deploying the same on a wall of a building are disclosed. The assembly includes a messenger member and a plurality of fiber optic cables each having a length, a connectorized end, and containing at least one optical fiber, the fiber optic cables being removably secured to the messenger member at a plurality of locations. The fiber optic cables are secured to the messenger member at a plurality of locations that correspond to select building locations, such as windows, through which the cable can be fed into the building.

14 Claims, 12 Drawing Sheets

FIBER OPTIC DROP CABLE ASSEMBLY FOR DEPLOYMENT ON BUILDING WALLS

PRIORITY APPLICATION

This application claims the benefit of U.S. Provisional Application Ser. No. 61/185,433 filed on Jun. 9, 2009, the entire contents of which are incorporated by reference herein.

BACKGROUND ART

1. Technical Field

The present invention relates generally to fiber optic cables, and in particular relates to fiber optic drop cable assemblies for deployment on building walls.

2. Technical Background

Fiber optic communications has experienced explosive growth. In just a few years, the transmission of communication signals for voice, video, data, and the like has soared, and more growth is planned as fiber optic communication technology improves and networks expand to provide greater access.

Fiber optic cables are the backbone of fiber optic communication systems. Fiber optic cables carry optical fibers and other cable elements, which are protected from the external environment by an external jacketing.

Fiber optic cables that carry optical signals to a home or other locations from a connection point (e.g., a local splice box or "fiber distribution terminal" or FDT) on the distribution cable in so-called "fiber-to-the-X" (FTTX) networks are referred to in the art as "drop cables." In office buildings and apartment buildings (referred to in the art as "multiple dwelling units" or "MDUs"), drop cables are preferably deployed internal to the building, usually through ductwork or molding. However, for certain buildings, and in particular older buildings, such deployment can be time consuming and expensive. Further, in many older buildings, there may actually be no practical way to internally route cabling through the infrastructure. One present alternative to internal cable deployment is to deploy copper cable on the outside of the building. However, this approach is expensive and does not provide the telecommunication performance offered by fiber optic cables.

Deploying fiber-based drop cables on the outside wall of a building would be a preferred cabling solution in terms of telecommunications performance, material cost, and speed of deployment. However, such a solution is made very difficult by the bending tolerances of typical fiber-based drop cables, and is complicated by the need to ground the steel messengers used to offload mechanical loads and strains that would otherwise be borne by the fiber optic cable.

SUMMARY OF THE INVENTION

The invention is directed to a fiber optic cable assembly for deploying on a wall of a building and associated methods. The assembly includes a messenger and a plurality of fiber optic cables each having a length, a connectorized end, and containing at least one optical fiber, with the fiber optic cables being removably secured to the messenger member at a plurality of locations.

One aspect of the invention is a fiber optic cable assembly for deploying on a wall of a building. The assembly includes messenger member having a central axis and that comprises at least two axial dielectric strength elements that lie in a plane that includes the central axis and that are surrounded by a dielectric body. The assembly also includes a plurality of fiber optic cables each containing at least one optical fiber and a connectorized end, with the fiber optic cables being removably secured to the messenger member by a plurality of straps.

A further aspect of the invention is a method of deploying a fiber optic cable assembly on a wall of a building. The method includes providing a plurality of fiber optic cables each having a length, a connectorized end, and containing at least one optical fiber. The method also includes removably securing the plurality of fiber optic cables to a messenger member using a plurality of straps. The method further includes fixing the messenger member to the building at two locations, and tensioning the messenger member between the two locations so that it supports the plurality of fiber optic cables.

Additional features and advantages of the invention are set forth in the detailed description that follows, and in part will be readily apparent to those skilled in the art from that description or recognized by practicing the invention as described herein, including the detailed description that follows, the claims, and the appended drawings. It is to be understood that both the foregoing general description and the following detailed description present exemplary embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the detailed description, serve to explain the principles and operations thereof.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION OF THE INVENTION

Reference is now made to preferred embodiments of the invention, examples of which are illustrated in the accompanying drawings. Whenever possible, the same or similar reference numbers and symbols are used throughout the drawings to refer to the same or similar parts.

Cartesian X-Y-Z coordinates are referenced in certain Figures for the sake of reference, with the "vertical" direction being the Z-direction and the direction of gravity.

Term "axially arranged" in connection with the dielectric messenger discussed below means substantially along the direction of the central axis, and not necessary coaxial with the central axis.

Fiber Optic Drop Cable Assembly

Figure 1:
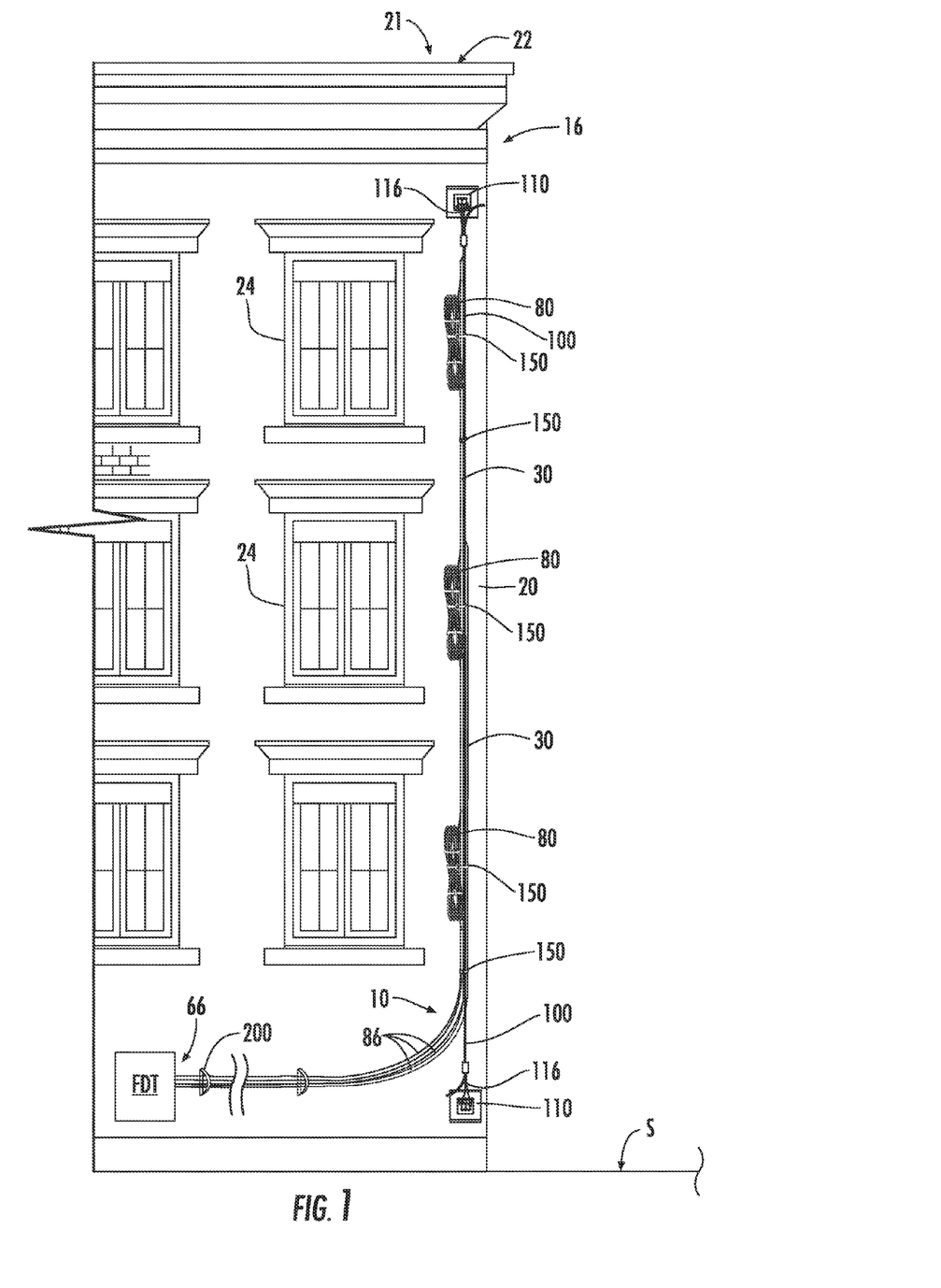
FIG. 1 is a schematic front-on view of an example embodiment of the fiber optic drop cable assembly ("assembly") as shown deployed on an outside wall of a building.

FIG. 1 is a schematic front-on view of an example embodiment of the fiber optic assembly ("assembly") 10 as shown deployed on a building 16 on an outside wall 20. Building 16 includes a roof 21 that has a "knee wall" 22, and wall 20 includes openings 24. Openings 24 may be, for example, windows, vents, holes, etc., through which a drop cable can be feed into the interior of the building. Openings 20 can thus have a variety of sizes and shapes. Cartesian X-Y-Z coordinates are described in FIG. 1 for the sake of reference, with the Z-direction indicating the "vertical" relative to the earth's surface S, which is substantially in the X-Y plane.

It is noted here that while building wall 20 is shown as being vertical, assembly 10 is suitable for employment on any building wall or surface on which deployment requires tension to keep the assembly fixed to the building. Thus, building surface 20 can also be sloped or in some cases even substantially horizontal. Also, wall 20 can be an inside or interior wall.

Assembly 10 includes a plurality of optical fiber drop cables ("cables") 30, a dielectric messenger ("messenger") 100, and securing members 150 that removably secure the cables to the dielectric messenger at various locations, and in some cases secures the cables to themselves in bundled form and/or to each other, as described below. In an exemplary embodiment, securing members 150 consist only of one or more dielectric materials. Messenger 100 is secured at or near its respective ends to wall 20 via span anchors 110 using, for example, a wire or metal cable 116. Wall 20 is shown as being in the X-Z plane and thus "vertical" for ease of illustration. The term "removably secure" means that cables 30 can be removed from messenger 100 by removing the securing members, and is in contrast to permanently securing the cables to the messenger member.

In a preferred embodiment, assembly 10 is substantially constituted by dielectric materials to the extent that it requires no bonding or grounding or other fail-safe mechanisms associated with copper-based cables. In an example embodiment, cable 30, messenger 100 and securing members 150 all consist of dielectric materials. However, other embodiments may use components that are not entirely dielectric.

Figure 2:
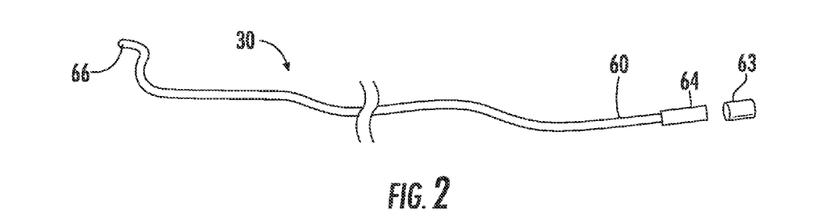
FIG. 2 is a schematic side view of an example fiber optic cable.
Figure 3:
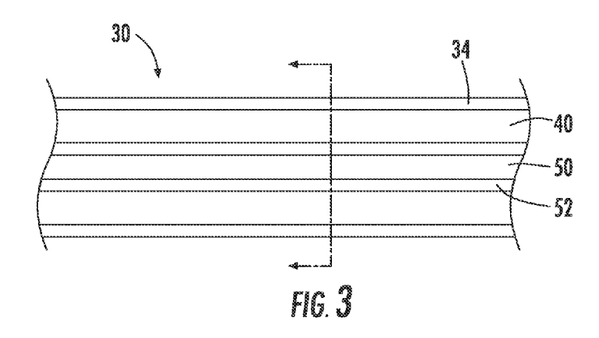
FIG. 3 and FIG. 4 are close-up cross-sectional views of the fiber optic cable of FIG. 2 as taken along the length of the cable and across the cable, respectively.
Figure 4:
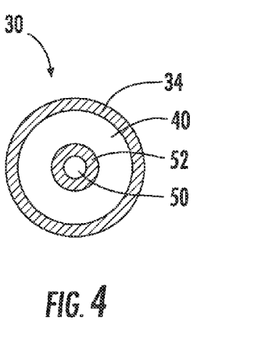

FIG. 2 is a schematic side view of an example cable 30, and FIG. 3 and FIG. 4 are close-up cross-sectional views of the cable as taken along the length of the cable and across the cable, respectively. The example cable 30 is a tight-buffered fiber optic cable that has outer protective cover (i.e., a jacket) 34, a strength (e.g., "yarn") layer 40 and at least one optical fiber 50 having a buffer coating 52. In an example embodiment, buffer coating 52 is color-coded according to industry-accepted color identifications used in the telecommunications industry, i.e., Blue, Orange, Green, Brown, Slate, White, Red, Black, Yellow, Violet, Rose and Aqua. In advantageous embodiments, optical fiber 50 is a bend-insensitive optical fiber that has superior bend performance compared with typical optical fiber. FIG. 2 also shows a protective cap 63 (not yet attached) that may be used for protecting a connector on an end portion of the cable assembly.

An exemplary bend-insensitive optical fiber 50 is the CLEARCURVE® optical fiber, available from Corning, Inc., Corning, N.Y. Bend-insensitive optical fiber 50 can be either single mode or multimode, though single-mode fiber may be preferred for certain types of drop cables. Bend-insensitive optical fiber 50 exhibits very low bend-induced attenuation, and in particular very low macrobending induced attenuation, which allows cables 30 to be strongly bent, including formed into tight bundles while still having suitable optical performance.

An exemplary bend-insensitive optical fiber 50 includes a core region and a cladding region surrounding the core region, the cladding region comprising a depressed-index annular portion comprising a depressed relative refractive index relative to another portion of the cladding. The depressed-index annular portion of the cladding is preferably spaced apart from the core. The depressed-index annular portion may, for example, comprise a) glass comprising a plurality of voids, or b) glass doped with one or more down-dopants such as fluorine, boron, individually or mixtures thereof.

In some embodiments, bend-insensitive optical fiber 50 comprises a cladding with voids, with the voids in some preferred embodiments being non-periodically located within the depressed-index annular portion. "Non-periodically located" means that if one takes a cross section (such as a cross section perpendicular to the longitudinal axis) of the optical fiber, the non-periodically disposed voids are randomly or non-periodically distributed across a portion of the fiber (e.g. within the depressed-index annular region). Similar cross sections taken at different points along the length of the fiber will reveal different randomly distributed cross-sectional hole patterns, i.e., various cross sections will have different hole patterns, wherein the distributions of voids and sizes of voids do not exactly match for each such cross section. That is, the voids are non-periodic, i.e., they are not periodically disposed within the fiber structure. These voids are stretched (elongated) along the length (i.e. generally parallel to the longitudinal axis) of the optical fiber, but do not extend the entire length of the entire fiber for typical lengths of transmission fiber. It is believed that the voids extend along the length of the fiber a distance less than about 20 meters, more preferably less than about 10 meters, even more preferably less than about 5 meters With reference again to FIG. 2, cable 30 has a connectorized end 60 that includes an optical-fiber connector 64, such as a SC/APC (subscriber connector/angled physical contact) connector. The opposite end 66 of cable 30 is preferably unconnectorized so that the cable can be optically connected (e.g., spliced) to another fiber optic cable of an optical fiber network (not shown) at a fiber distribution terminal (FDT), as discussed below. Cable 30 is referred to in the art as a "pigtail."

With reference again to FIG. 1, a portion of the length of cable 30 starting from connectorized end 60 is coiled into a bundle 80, which in an example is no greater than one foot long, but other bundle sizes are possible. In an example embodiment, the overall length of cable 30 is preselected according to one or more criteria, such one or more dimensions of building 16 on which assembly 10 is to be deployed. In an example embodiment, the length of cable 30 in bundle 80 is tens of feet, e.g., 20 feet or so, while the overall length of the cable may be, for example, tens of feet to hundreds of feet, with 100 feet to 200 feet being typical lengths for many buildings.

Figure 5:
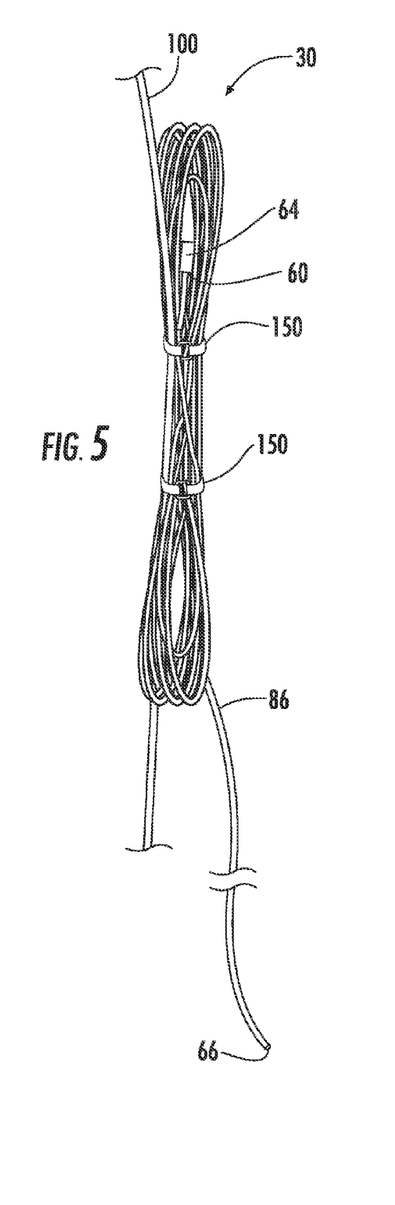
FIG. 5 illustrates an example cable bundle attached to the messenger and that includes a connectorized end tucked within the bundle for protection during deployment.

FIG. 5 illustrates an example cable bundle 80 attached to messenger 100 and that includes connectorized end 60. Connector 64 at connectorized end 60 is preferably tucked within bundle 80 to help protect it from the elements. In one example, connector 64 is encapsulated/disposed within a protective cover as shown in FIG. 2. In one embodiment, the protective cover 63 may be a cap that is sealed about the cable and cap using a tape such as a splicing tape that seals a UV-resistant, polymer based cap. Other suitable structures are also possible for protecting the connector 64 from the environment until connection is desired. The non-bundled portion of cable 30 that includes unconnectorized end 66 is called the "bundle tail" 86. Bundles 80 are secured to dielectric messenger 100 via securing members 150, preferably at select locations that correspond to where cables 30 are to be deployed (e.g., matched to the spacing between openings 24 in wall 20), as discussed below. Bundle tails 86 run the length of and are also attached to messenger 100 at various locations via securing members 150.

Figure 6:
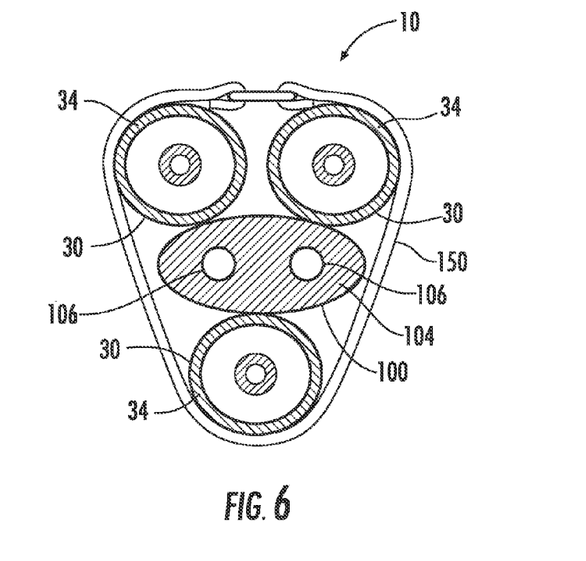
FIGS. 6 and 6a are cross-sectional views of a portion of the respective cable assembly showing the messenger and cables and illustrating an example embodiments wherein the cables and messengers have separate jackets where the cables are removably secured to the messenger via straps.
Figure 6A:
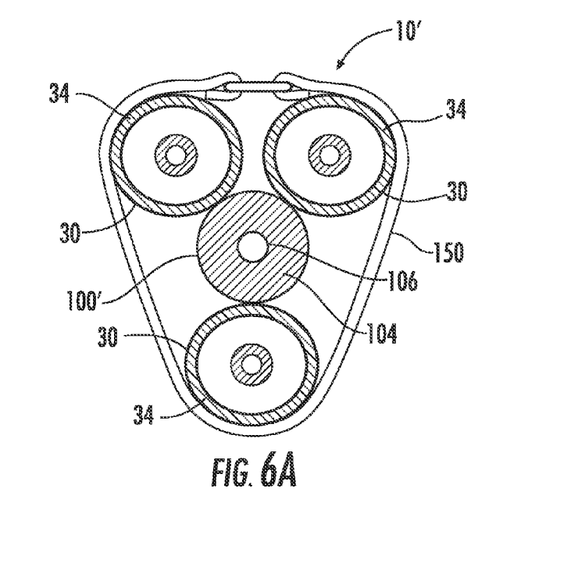

FIGS. 6 and 6a are cross-sectional views of portions of assemblies 10 and 10' showing respective messengers 100, 100' and cables 30 and illustrating example embodiments where the cables and messenger have separate jackets (i.e., cable protective cover 34 and messenger body 104, respectively), and where the cables are removably secured to the messenger via straps 150. The fact that cables 30 and messenger 100 do not necessarily share a common jacket allows for more flexibility in arranging the cables relative to the messenger, including forming cable bundles 80. Additionally, any suitable shape, construction, etc. for messenger is possible with the concepts disclosed. For instance, the FIG. 6a shows a messenger having a round cross-section with a single strength member which may has tradeoffs such as size, strength and/or bend radius compared with embodiments with two strength members in the messenger (See FIG. 11). Likewise, although dielectric messengers are preferred, the messenger may have a non-dielectric construction such as a metal stranded wire or the like.

Figure 7:
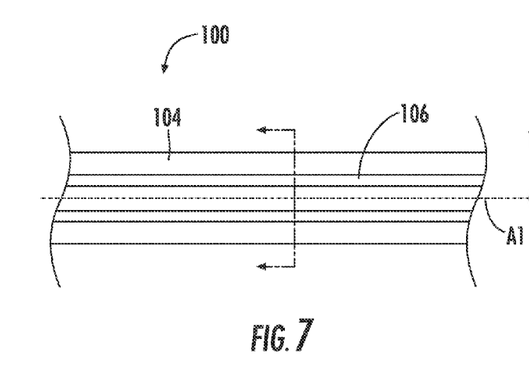
FIGS. 7 and 8 are close-up cross-sectional views of the dielectric messenger as taken along the length of the messenger and across the messenger, respectively.
Figure 8:
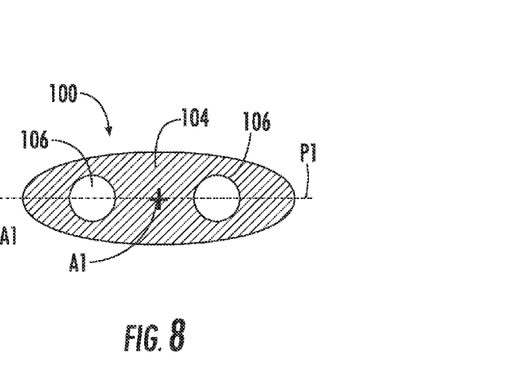

FIG. 7 and FIG. 8 are close-up cross-sectional views of messenger 100 taken along the length of the messenger and across the messenger, respectively. Messenger 100 includes a dielectric body 104 with a central axis A1 and at least one axially arranged strength element 106 that runs the length of the messenger. Dielectric body 104 serves as a protective cover or jacket for messenger 100. In the example embodiment shown, messenger 100 includes two wire-like strength elements 106 arranged on either side of axis A1 and in a plane P1 defined by the two strength elements and the central axis. In an example embodiment, strength elements 106 comprise glass-reinforced plastic (GRP), but other suitable strength members are possible.

Figure 9:
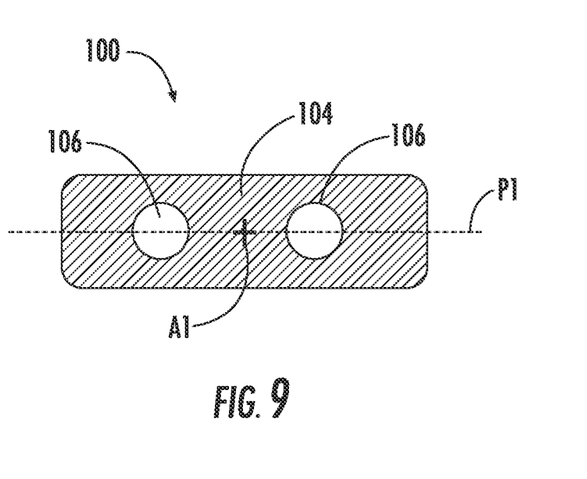
FIG. 9 is a cross-sectional view of the dielectric messenger similar to that shown in FIG. 8, but that illustrates a messenger having a substantially rectangular-shaped cross-section.

In an example embodiment, messenger 100 has an elliptical (i.e., oval) cross-section shape, with plane P1 coinciding with the major axis of the ellipse. Other cross-sectional shapes, such as the generally rectangular cross-sectional shape in the cross-sectional view of FIG. 9, can also be used.

In an example embodiment, messenger 100 is formed by passing one or more dielectric strength elements 106 through a pressure extruder along with a suitable dielectric material for body 104, thereby encapsulating the strength elements within the dielectric body. In an example embodiment, dielectric body 104 is formed from polyethylene (PE) or like polymer material used to form protective covers for cabling. In an example embodiment, the temperature profile of the extruder preferably ranges from 140° C. to 200° C. when extruding PE material in order for messenger 100 to maintain its intended cross-sectional shape. In an example embodiment, cable 30 and messenger member 100 do not share a common jacket, i.e., cable protective cover 41 and messenger body 104 define separate covers that are not co-joined substantially entirely along their length, e.g., by a section of jacket material that binds the cable and messenger together substantially along their entire lengths.

Figure 10:
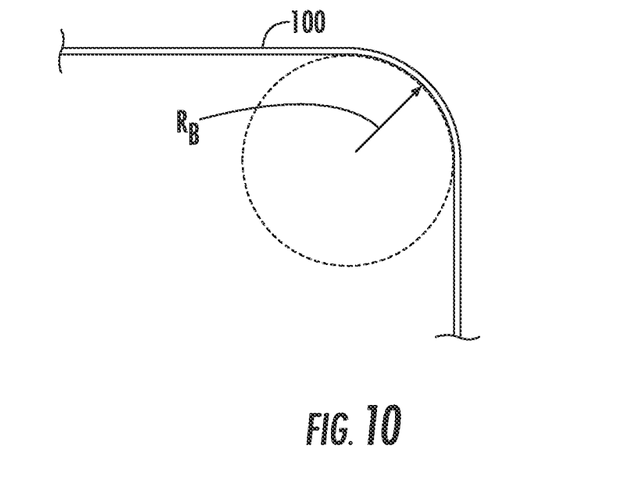
FIG. 10 is a schematic diagram of a section of the messenger having a bend and illustrating the bend radius $R_B$.

The use of two relatively small-diameter strength elements 106, rather than one larger strength element, provides messenger 100 with a smaller minimum bend radius $R_B$, as illustrated in FIG. 10. This is beneficial because it allows for cables 30 and messenger 100 to bend around relatively sharp corners, such as over a building knee wall 22 (FIG. 1), while also providing the required axial strength (strength modulus) to bear the necessary tension used when deploying assembly 10. In an example embodiment, bend radius $R_B$ is about 8 inches or less, more preferably about 6 or less and even more preferably about 5 inches.

Figure 11:
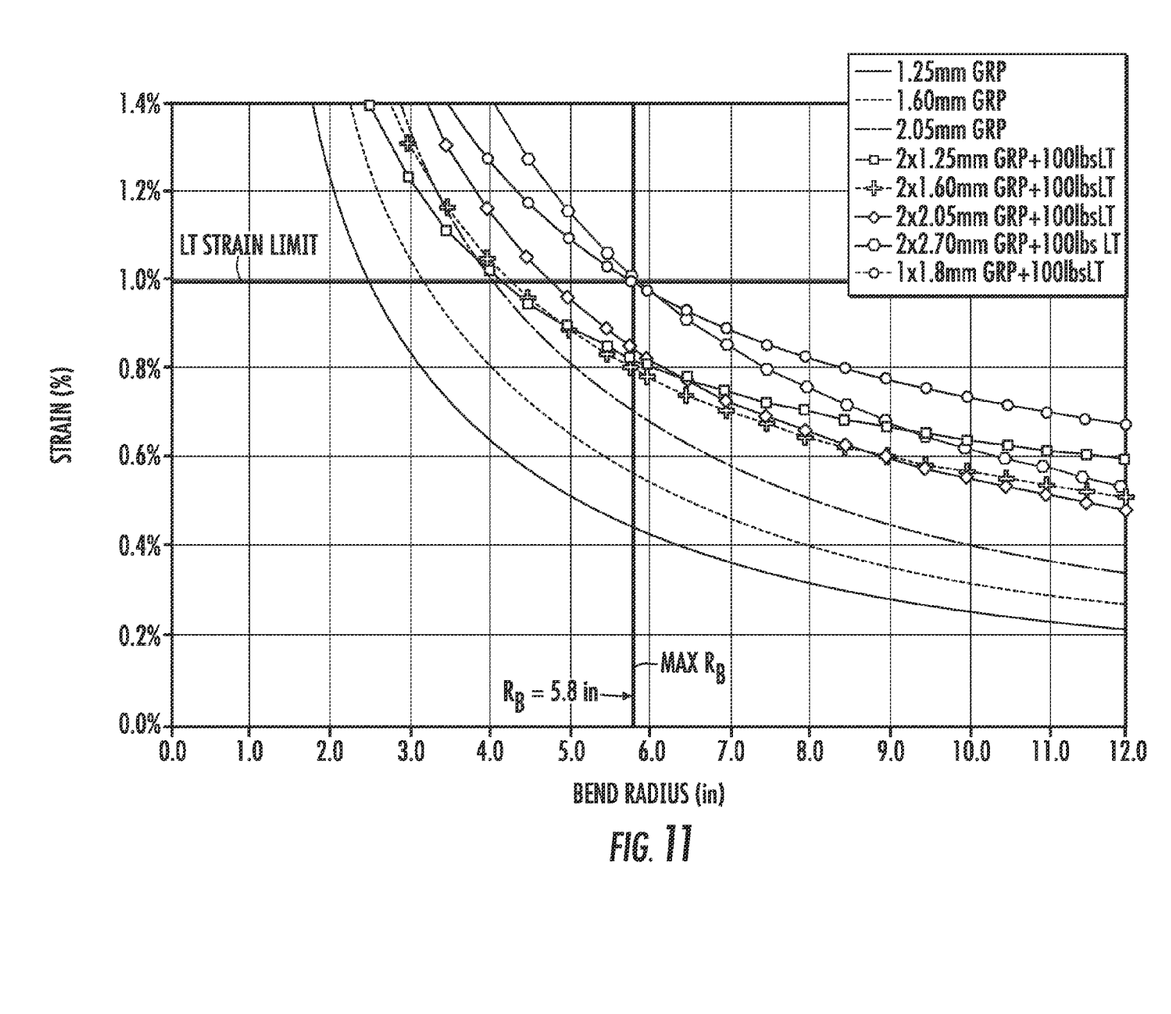
FIG. 11 is a plot of strain (%) versus bend radius (inches) for a variety of messenger configurations, such as different outside diameters for GRP strength elements, and single and double strength-member configurations.
Figure 12:
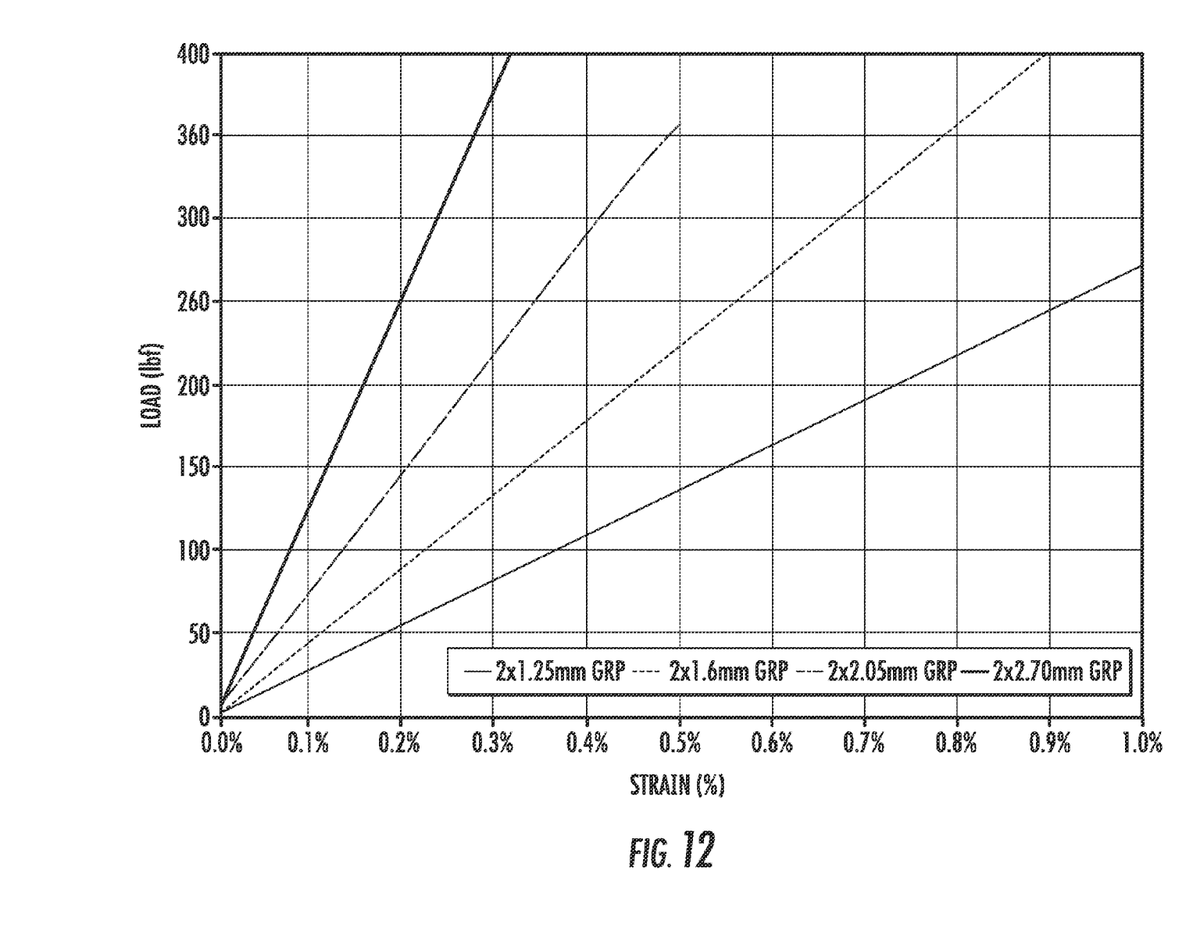
FIG. 12 is a plot of the load (lbf) vs. strain (%) for several different messenger configurations.

FIG. 11 is a plot of strain (%) versus bend radius (inches) for variety of messenger configurations, such as different GRP strength element outside diameters, and single and double strength-element configurations. The plot of FIG. 11 also shows the bending radius limit $R_B$=5.8 inches corresponding to a strain of 1%. FIG. 12 is a plot of the load (lbf) vs. strain (%) for different configurations of messenger 100.

Of significance in the plot of FIG. 11 is the curve for messenger 100 having two axially arranged GRP strength elements 106 of diameter 1.25 mm as compared to the curve for the messenger having a single 1.8 mm GRP strength element. These two embodiments of messenger 100 have the same strength element cross-sectional area and elastic modulus. However, the two curves indicate that there is a significant bending advantage to using two smaller strength elements 106 rather than one larger strength element. It is noted that a smaller bend radius for messenger member 100 is preferable from an aesthetic point of view. As the bend diameter ($2R_B$) approaches or exceeds the knee-wall thickness T, the bend-limiting device 180 (discussed below) becomes visually more conspicuous and thus an unattractive addition to the building.

Based on the bend radius limit $R_B$, in one example it is preferred that the largest outside diameter for strength element 106 for a dual strength element embodiment of messenger 100 be about 2.70 millimeters (mm). Of course, the outer diameter may be less than 2.7 millimeters as desired. According to the plot of FIG. 12, such a messenger has an elastic modulus times the cross-sectional area of about 573,000 Newtons (128,770 lbs) (i.e., an EA value). In an example embodiment, messenger 100 has a strength modulus of about 600,000 Newtons or less (i.e., an EA value), but other suitable values are possible. Additionally, the concepts disclosed herein may be used with a messenger having a single strength member with an EA value that is about 600,000 Newtons or less such as shown in FIG. 6A.

In an example embodiment, strength elements 106 are provided with an adhesive coating (not shown) that allows for more efficient load transfer from span anchor 110 through the messenger body 104 and into strength elements 106. Consequently, the deployment of assembly 10 can utilize very low cost and easily installed standard termination equipment, such as a 2-Pair P-clamp and a 'rams-head' anchor fixture as known, which fit in the relatively tight (e.g., 1-2 feet vertical distance) space of building knee wall 22, as described below.

Coiled Assembly Configuration

Figure 13:
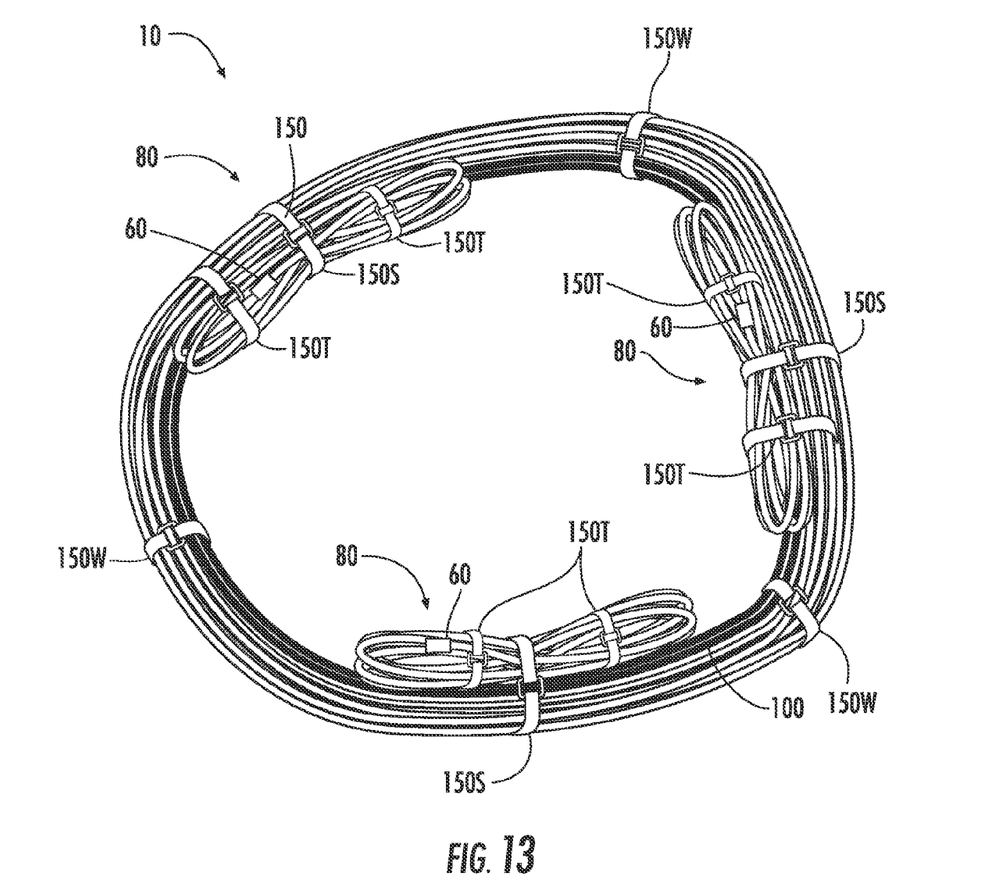
FIG. 13 is a schematic diagram of the assembly in a coiled configuration prior to deployment.

FIG. 13 is a schematic diagram of assembly 10 in a coiled configuration prior to deployment. Cables 30 and messenger 100 are coiled in a compact manner, with removable securing members 150 used to keep the coil together as well as to secure bundles 80 and bundle tails 86 to messenger 100. Example securing members 150 include weather-resistant tie-wraps, straps and fasteners (such as DELTEC® tie-wraps, straps and fasteners available from Thomas & Betts Corp, Memphis, Tenn.) splicing tape, and dielectric lashing wire (e.g., urethane jacketed KEVLAR® lashing wire) used to secure the bundles and their tails to the messenger.

In one example, tie-wrap-type securing members 150T are used to secure bundle tails 86 to messenger 100 and to maintain bundles 80, while strap-type securing members 150S are used to secure the bundles to the messenger. Likewise, securing members 150W in the form of lashing wire and/or splicing tape are used to secure the portion of cables 30 in between bundles 80 to messenger 100. In an example embodiment, messenger 100 is advantageously labeled as "MESSENGER" to distinguish it from drop cables 30, which can look somewhat like the messenger, especially when they are the same color. Likewise, it is advantageous that cables 30 be labeled (e.g., as "CABLE-01", "CABLE-02", etc.) so that they can be easily identified and distinguished from one another during deployment.

Deploying the Fiber Optic Drop Cable Assembly

Assembly 10 can be deployed on building 16 using, for example a "feed up" method or a "feed down" method, depending whether the FDT is on or near the roof or on or near the ground. When deployed, assembly 10 relies on messenger 100 to bear the majority of the load and strain without transferring it to cables 30 during initial installation as well as while deployed and subject to environmental loading conditions such as rain, snow, ice and wind. Because messenger 100 is substantially or completely dielectric, no bonding or grounding is required, making the assembly more cost effective and easier to deploy.

Figure 14:
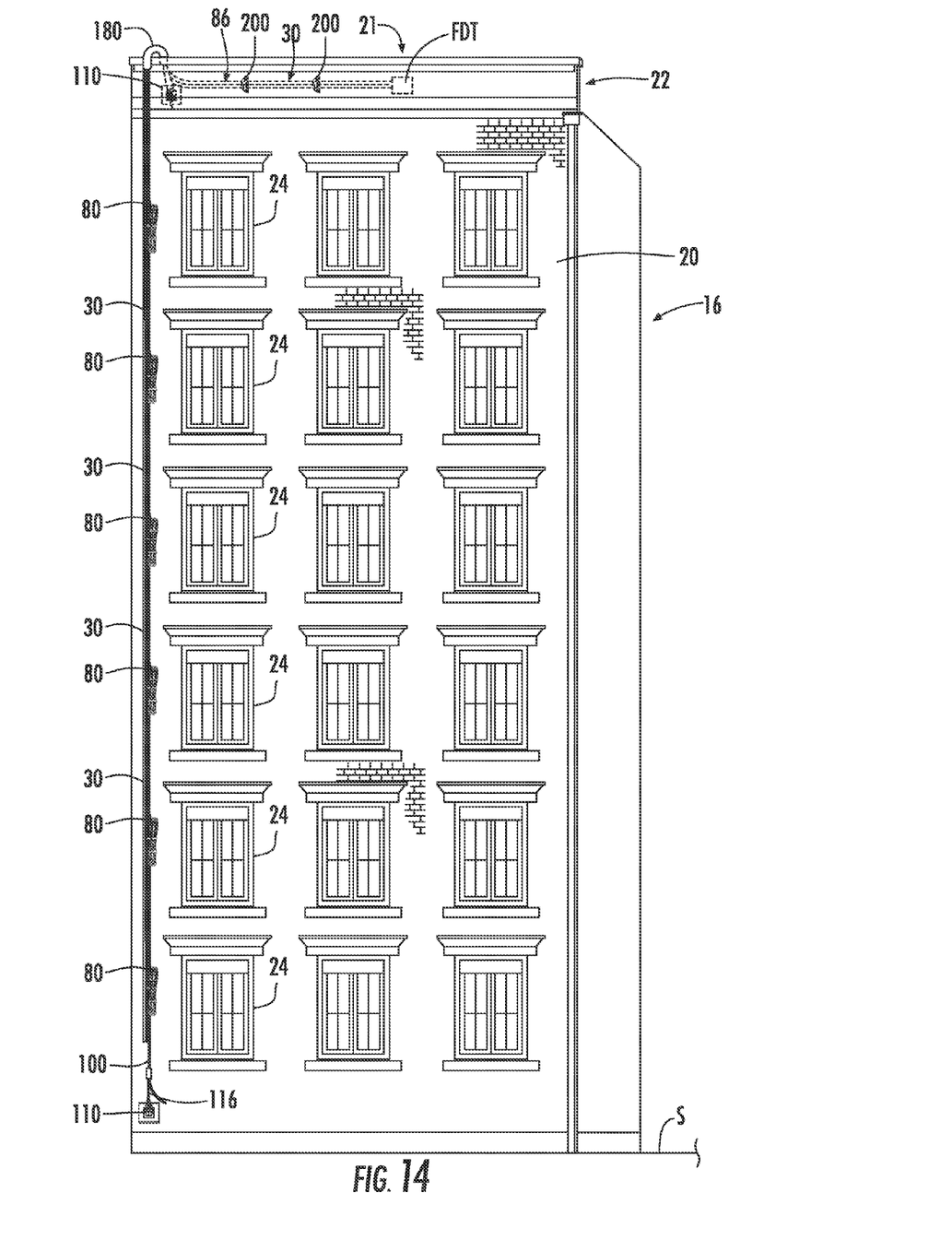
FIG. 14 is a schematic diagram of a building and the wall onto which the assembly is deployed in a first example configuration wherein the FDT is on the roof.

FIG. 14 is a schematic diagram of building 16 onto which assembly 10 is deployed in a first example configuration wherein the FDT is on roof 21. In this example, cable tails 86 are routed to the rooftop FDT and the cable ends 66 are optically connected (e.g., spliced) to other fiber optic cables (not shown) in the FDT. Messenger 100 has a rooftop end 101 that is secured to a span anchor 110 either on wall 20, or on knee wall 22, using metal wire/cable 116, as shown in the close-up view of FIG. 15. This latter termination method is safer for the technician as well as for those traveling near the building because the technician need not lean over building knee wall 22 to attach assembly 10 to the building.

Figure 15:
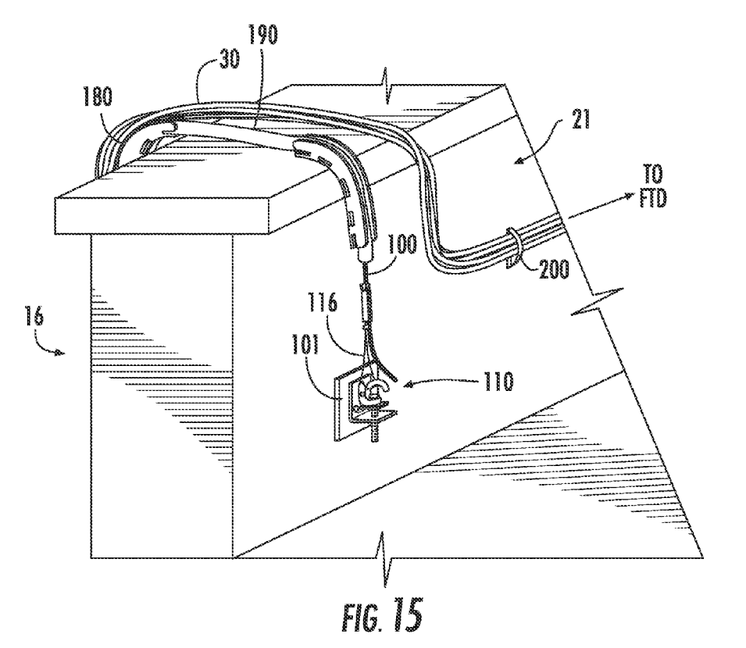
FIG. 15 is a close-up perspective view of the knee wall portion of the top of the building, illustrating how the messenger is secured to the knee wall while the cable tails are directed to the rooftop FDT.
Figure 16:
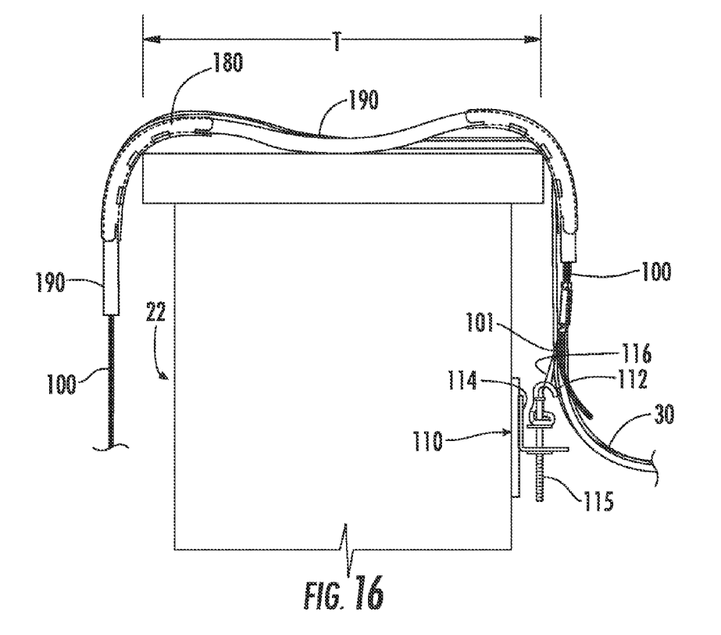
FIG. 16 is side view of the building knee wall showing an example embodiment wherein the section of the messenger that passes through the bend-limiting member and over the knee wall also passes through an abrasion tube that prevents the messenger from abrading against the knee wall.

In the case where messenger 100 and cables 30 travel over knee wall 22, in an example embodiment, a bend-limiting device 180, such as a curved cable guide, is used to limit the bending radius of the messenger and preferably the cables as well. Further, in another example illustrated in FIG. 16, a portion of messenger 100 is fed through an abrasion tube 190, which serves to further protect the messenger from damage from abrasion caused by the an external source such as the building wall or knee wall. Bend limiting device 180 has an associated first bending radius and maintains the portion of the messenger 100 supported thereby at a second bending radius that is equal or greater than the first bending radius. In an example embodiment, bend-limiting devices 180 are placed on each corner of knee wall 22 having knee-wall thickness T, as shown in FIG. 15 and FIG. 16.

Figure 17:
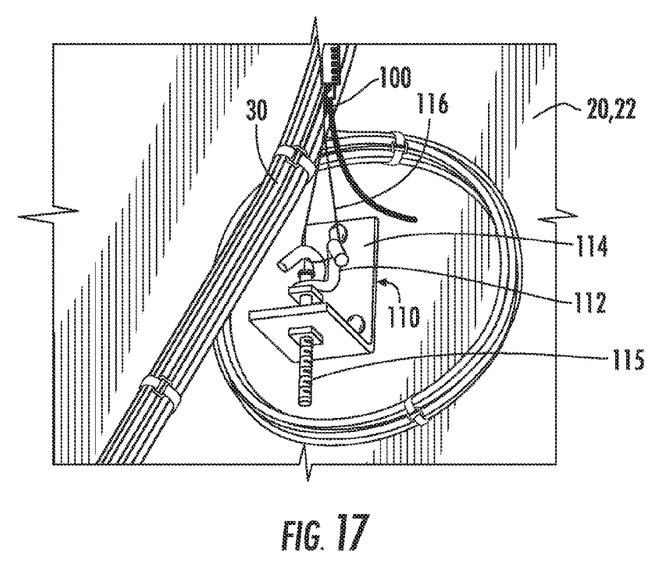
FIG. 17 is a close-up perspective view of an example span anchor that includes a rams-head fixture.

In one embodiment illustrated in FIG. 17, span anchor 110 includes a fixture 112 (e.g., a "ram's head" fixture, as shown) secured to knee wall 22 or wall 20 by an L-bracket 114. A wire/metal cable 116 (e.g., a two-pair drop wire clamp) is used to secure messenger 110 to fixture 112. In a related embodiment, wire/metal cable 116 is secured or clamped directly to the vertical section of messenger 100 that hangs over knee wall 22. Wire/metal cable 116 is then deployed over knee wall 22 and attached to building outside surface 20. Tension, which is applied by a tensioning device 115 such as a tensioning bolt, is thus carried by a wire/metal cable 116 and not by the section of messenger 100 that extends over knee wall 22. This reduces or eliminates the load-bearing requirement of messenger 100 at knee wall 22, obviating the need to maintain a minimum messenger bend radius $R_B$. In this embodiment, messenger 100 provides rigidity to the portion of assembly 10 at knee wall 22.

Prior to securing messenger 100 to span anchors 110, the position of the messenger relative to building 16 is adjusted so that bundles 80 substantially align with desired building positions, e.g., with openings 24, such as shown in FIG. 14. Tension is then applied to messenger 100 (e.g., via tensioning member 115) to prevent the messenger and cables 30 attached thereto from moving and rubbing against building 16. Messenger 100 is then secured at span anchors 110 via wire/metal cable 116 to maintain messenger tension. In an example embodiment, the messenger tension is about 50 lbs. This tension is applied in one example by elongating messenger 100 a recommended length (e.g., about 2 inches) at the lower span anchor 110 via a pressure clamp (e.g., a 2-Pair P-clam) and a rams-head fixture plus a tensioning device 115 (e.g., a tensioning bolt).

Figure 18:
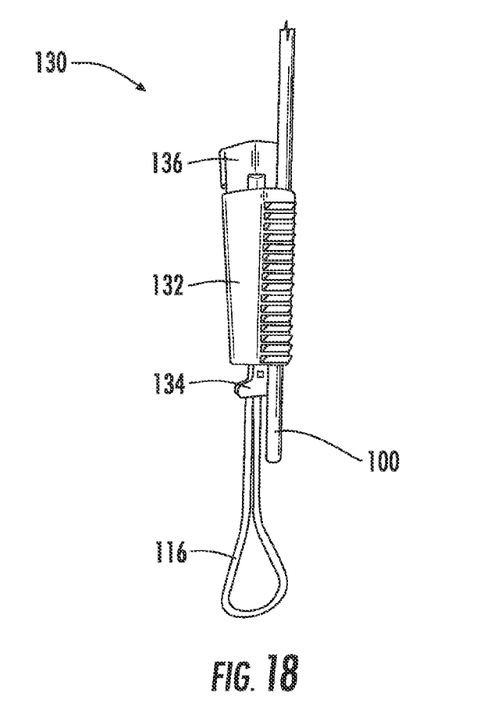
FIG. 18 is a schematic diagram of an example pressure clamp used to secure the messenger to the span anchor.

FIG. 18 is a schematic diagram of an example pressure clamp 130 used to secure messenger 100 to span anchor 110. Pressure clamp 130 includes a body 132, a grip 134 and a wedge 136 for clamping (i.e., squeezing) messenger 100 with increasing frictional force as the tension on the messenger is increased. An example pressure clamp 130 is described in U.S. Pat. No. 7,359,380, the disclosure of which is incorporated by reference herein.

Figure 19:
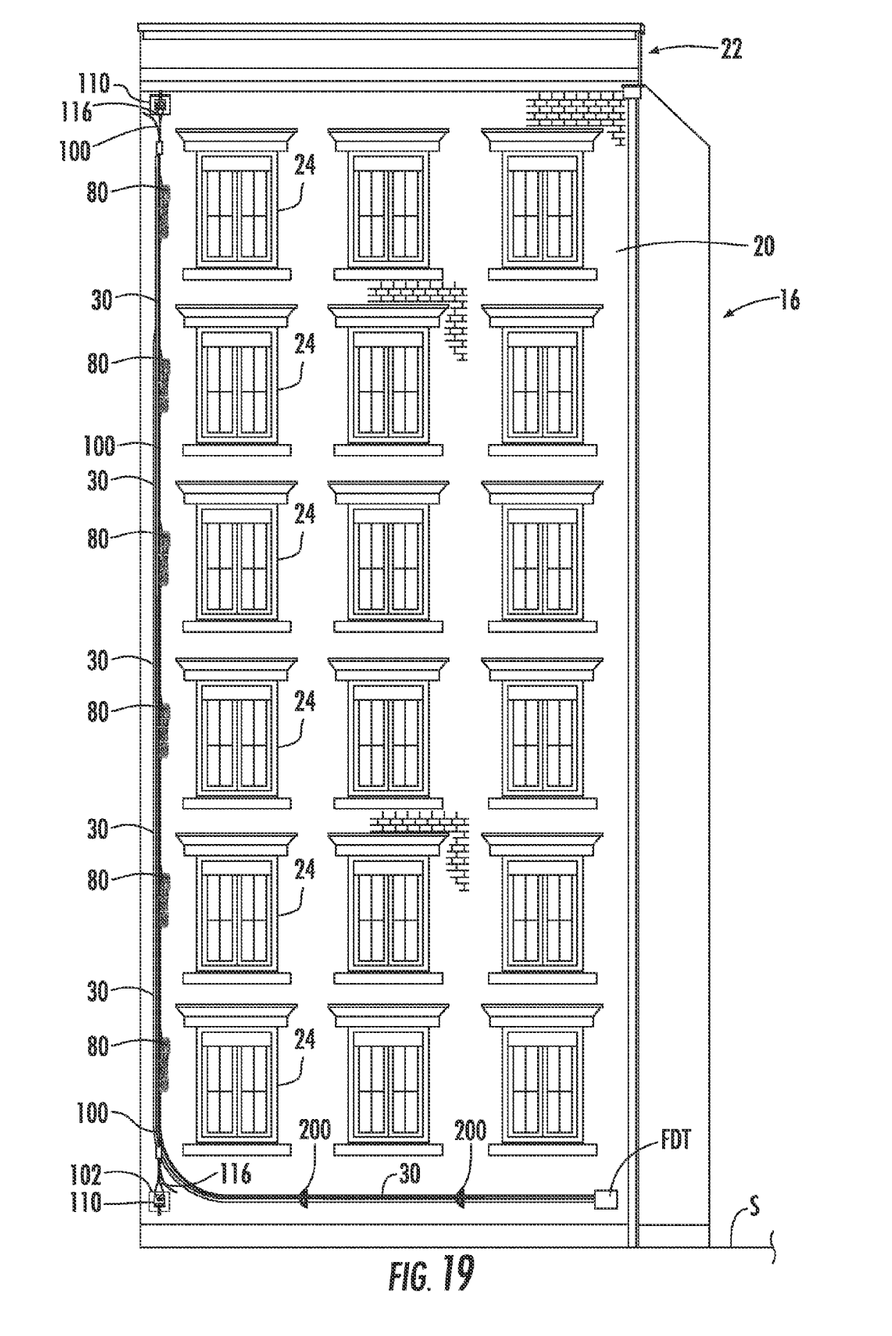
FIG. 19 is a schematic diagram similar to FIG. 14, but illustrating a deployed assembly for the case where the FDT is at or near ground level.

FIG. 19 is a schematic diagram similar to FIG. 14, but illustrating a deployed assembly 10 when the FDT is at or near ground level. In an example deployment, cable guides 200, such as D-rings, are used to guide cables 30 horizontally along building 16 from where they diverge from messenger 100 to travel to the FDT.

Figure 20:
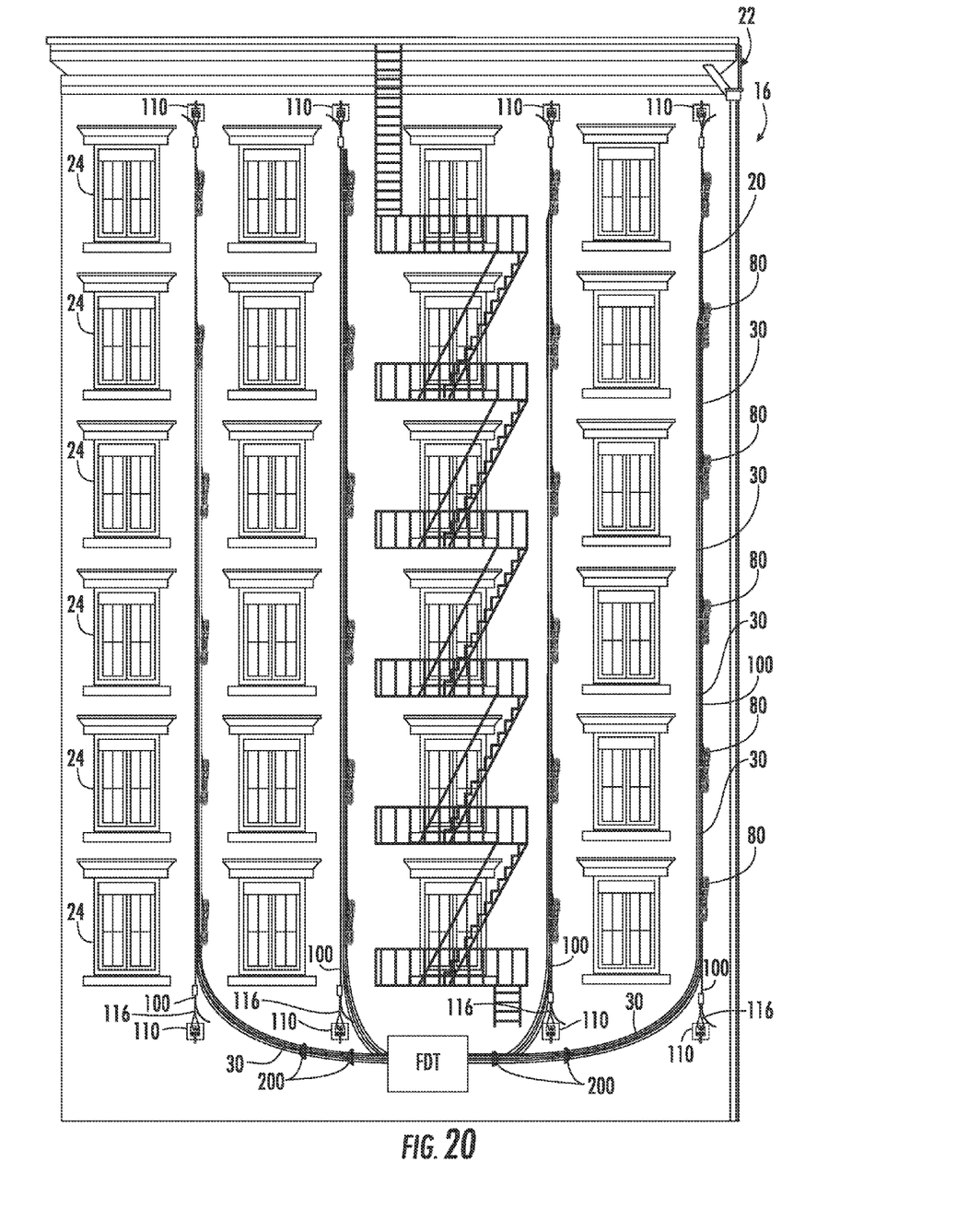
FIG. 20 is a schematic diagram of a six-story building that includes a number of deployed fiber optic drop cable assemblies each having six cable bundles.

The number of bundles 80 used in assembly 10 depends on the size of the building and the number of cable connections desired. FIG. 20 is a schematic diagram of a six-story building 16 that includes a number of deployed assemblies 10 that include six bundles 80, thereby providing cable service to each floor of the building. The floor spacings determine the location of the six bundles 80 for each assembly 10, and these spacings can vary within a given building, though they are shown the same in FIG. 20 for ease of illustration. Note also that the distance from the FDT dictates how long each assembly 10 needs to be. Thus, with the FDT located near the center of the building, assemblies 10 that service the outside of building 16 need to be longer (e.g., 200') than those that service the more central portion of the building (e.g., 100').

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A fiber optic cable assembly for deploying on a wall of a building, the assembly comprising:
   a messenger member having a central axis and comprising two axially arranged dielectric strength elements that lie in a plane that includes the central axis and that are surrounded by a dielectric body;
   a plurality of fiber optic cables each having a length, a connectorized end, and containing at least one optical fiber, the fiber optic cables being removably secured to the messenger member with securing members at a plurality of locations;
   first and second span anchors for securing the messenger member to a building; and
   a tensioning device arranged relative to one of the span anchors and configured to apply tension to the messenger member.

2. The fiber optic cable assembly of claim 1, wherein the at least one optical fiber comprises a bend-sensitive optical fiber.

3. The fiber optic cable assembly of claim 1, wherein a portion of at least one fiber optic cable at the connectorized end is bundled.

4. The fiber optic cable assembly of claim 1, wherein the fiber optic cables and the messenger member each consist entirely of one or more dielectric materials.

5. The fiber optic cable assembly of claim 1, wherein the fiber optic cables and the messenger member do not share a common jacket.

6. The fiber optic cable assembly of claim 1, wherein the two axially arranged dielectric strength elements have a diameter of 2.7 millimeters or less.

7. The fiber optic cable assembly of claim 1, wherein the two axially arranged dielectric strength elements have a combined EA value of about 600,000 Newtons or less.

8. A fiber optic cable assembly for deploying on a wall of a building, the assembly comprising:
   a messenger member having a central axis and comprising two axially arranged dielectric strength elements that lie in a plane that includes the central axis and that are surrounded by a dielectric body;
   a plurality of fiber optic cables each having a length, a connectorized end, and containing at least one optical fiber, the fiber optic cables being removably secured to the messenger member at a plurality of locations;
   a bend-limiting device disposed relative to a portion of the messenger member to operably support the messenger member portion; and
   an abrasion tube that is at least partially supported by the bend-limiting device and that contains a portion of the messenger member, the abrasion tube configured to reduce or prevent abrasion of the portion of the messenger member from an external source of abrasion.

9. The fiber optic cable assembly of claim 8, wherein the at least one optical fiber comprises a bend-sensitive optical fiber.

10. The fiber optic cable assembly of claim 8, wherein a portion of at least one fiber optic cable at the connectorized end is bundled.

11. The fiber optic cable assembly of claim 8, wherein the fiber optic cables and the messenger member each consist entirely of one or more dielectric materials.

12. The fiber optic cable assembly of claim 8, wherein the fiber optic cables and the messenger member do not share a common jacket.

13. The fiber optic cable assembly of claim 8, wherein the two axially arranged dielectric strength elements have a diameter of 2.7 millimeters or less.

14. The fiber optic cable assembly of claim 8, wherein the two axially arranged dielectric strength elements have a combined EA value of about 600,000 Newtons or less.

* * * * *